June 9, 1925. 1,541,284
F. W. SCHROEDER ET AL
WHEEL
Filed April 22, 1924   2 Sheets-Sheet 1
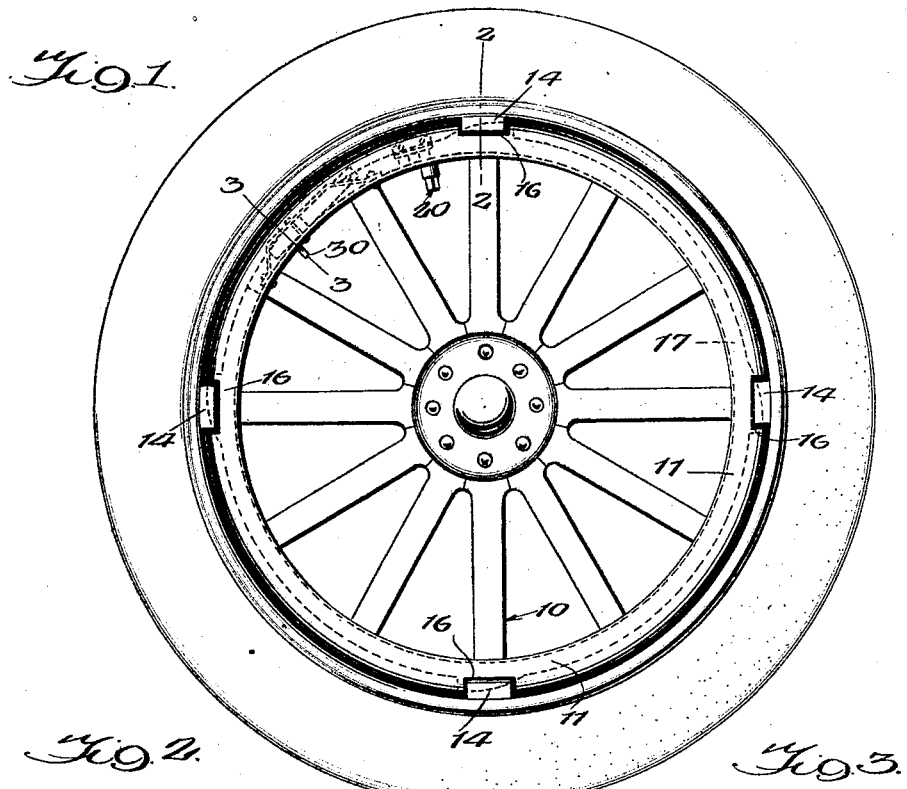
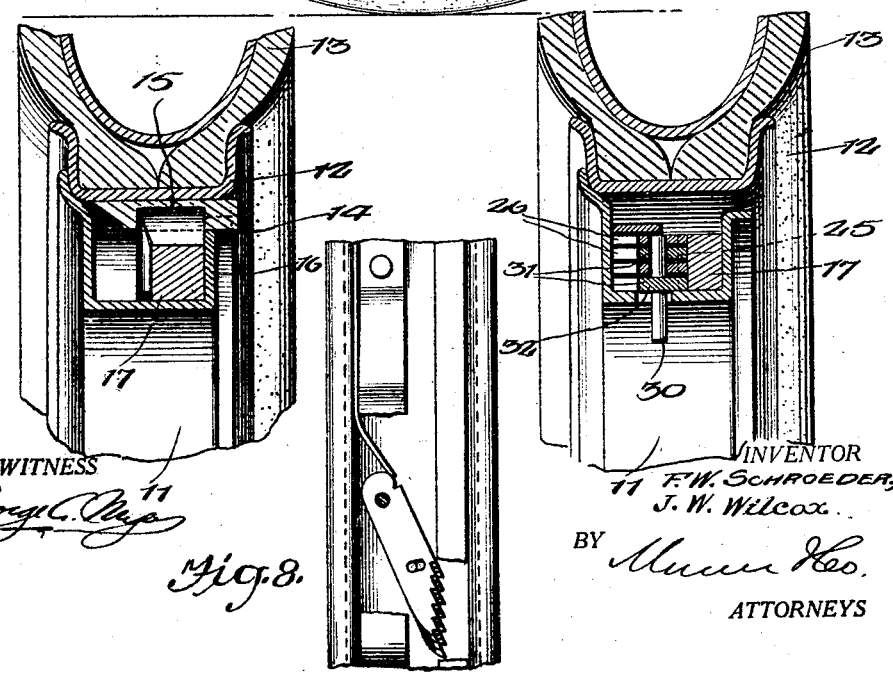
INVENTOR
F. W. Schroeder,
J. W. Wilcox
BY
ATTORNEYS

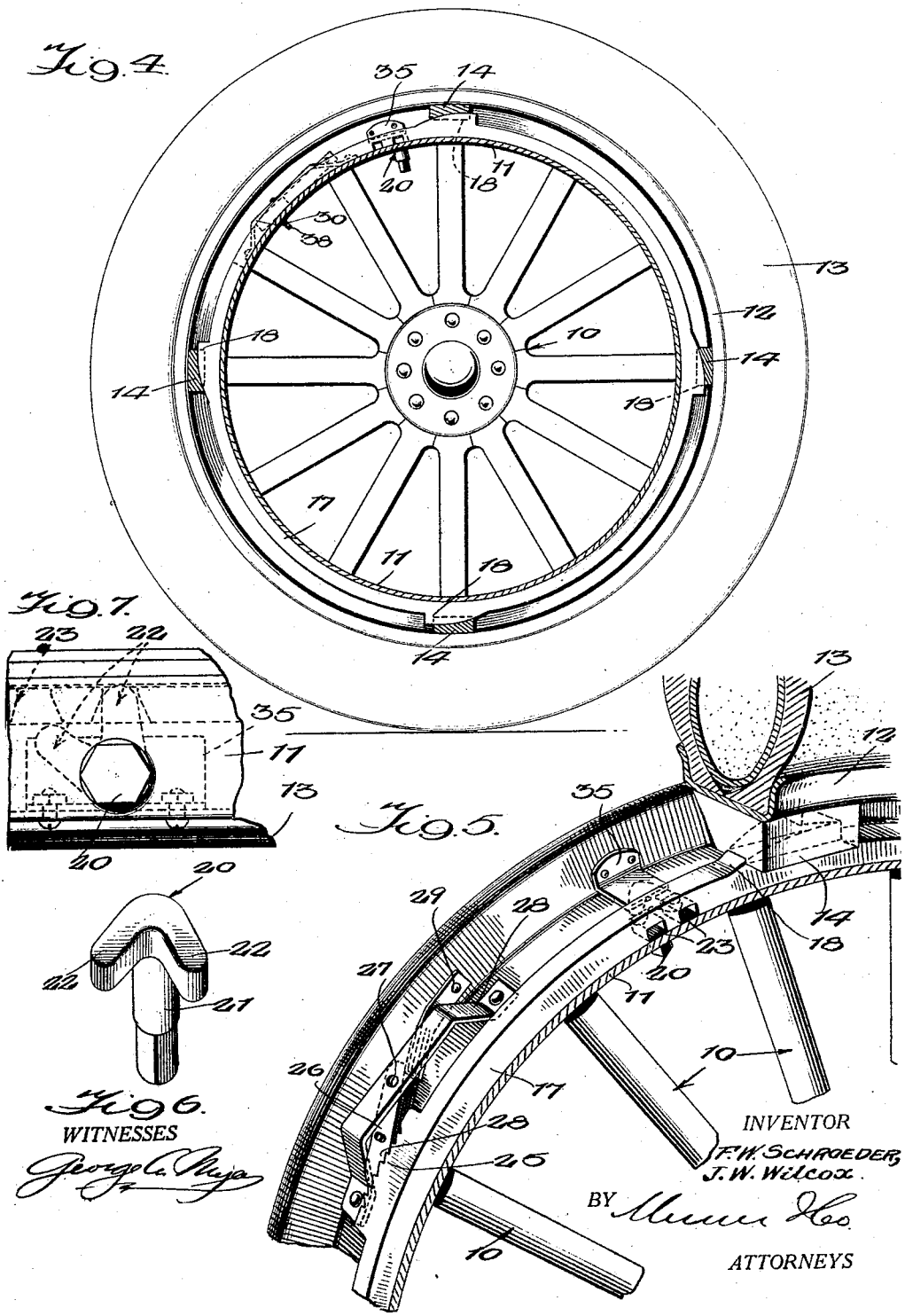

Patented June 9, 1925.

1,541,284

UNITED STATES PATENT OFFICE.

FRANK WILLIAM SCHROEDER AND JOHN WESLEY WILCOX, OF BEMIDJI, MINNESOTA.

WHEEL.

Application filed April 22, 1924. Serial No. 708,251.

*To all whom it may concern:*

Be it known that we, FRANK WILLIAM SCHROEDER and JOHN WESLEY WILCOX, citizens of the United States, and residents of Bemidji, in the county of Beltrami and State of Minnesota, have invented certain new and useful Improvements in Wheels, of which the following is a specification.

This invention relates to an improvement in wheels of the type including a demountable rim and is particularly designed for use on motor vehicles, such as automobiles or the like.

The object of the invention is to provide a wheel of this character wherein the demountable rim may be quickly and easily placed upon or taken from the fixed rim of the wheel with a minimum expenditure of time and labor and without the necessity of using special tools or of exercising unusual strength or skill.

A further object is to provide a wheel of this character and having the advantages and capacities mentioned and wherein the rim is rigidly and positively supported in proper position on the wheel whereby the rim is held in proper alinement with the wheel and the parts of the rim and wheel are preserved against distortion.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a view in side elevation, showing one embodiment of the invention;

Figure 2 is a fragmentary view in section, taken on line 2—2 of Figure 1;

Figure 3 is a similar view, taken on line 3—3 of Figure 1, parts being shown in elevation for the sake of illustration;

Figure 4 is a view in section, taken on the plane of the wheel, with parts shown in elevation;

Figure 5 is a fragmentary perspective view, illustrating the operating parts of the invention;

Figure 6 is a detail perspective view of the operating member of the wedge carrier;

Figure 7 is a detail view, showing the manner in which the operating member coacts with the wedge carrier; and Figure 8 is a detail view of the locking device.

Referring to the drawings, the numeral 10 designates a wheel which may be of any standard type and which includes a fixed rim 11 of channel form. A demountable rim 12 is provided and carries a tire 13.

A plurality of wedges 14 are welded or otherwise suitably secured to the under side of the demountable rim at spaced intervals therearound. The wedges 14 are provided with slots 15, the side walls of which taper or converge and the bottom walls of which are inclined. In order to permit the wedges 14 to pass into the channel on the fixed rim the outer side flange of the fixed rim is formed with notches 16 to accommodate the wedges 14.

A wedge carrier 17 is provided on the fixed rim of the wheel and in this embodiment of the invention comprises simply a ring of metal mounted in the channel making up the fixed rim and designed to be shifted circumferentially in said channel. At spaced angular intervals about the carrier 17 wedges, designated generally at 18 are provided, the wedges 18 being integrally formed with the carrier or being otherwise suitably connected thereto. One such wedge 18 is provided for each wedge 14, and the wedges 18 are correspondingly formed with respect to the slots 15 of the wedges 14. the side faces of the wedges 18 tapering or converging and the outer or upper faces of the wedges 18 being inclined. When the wedges 14 and 18 are engaged, the wedges 18 are disposed in the slots 15 of the wedges 14 with the outer inclined faces of the wedges 18 engaged with the correspondingly or oppositely inclined bottom faces or walls of the slots of the wedges 14.

In order to provide for the circumferential shifting of the ring or wedge carrier 17 so as to bring the wedges 18 into engagement with the wedges 14 or to move these parts out of engagement, an operating member, designated generally at 20 is provided and includes a short shaft 21 rotatably mounted in the base of the channel constituting the fixed rim 11. One end of the shaft 21 is made of polygonal formation in order to facilitate rotation of the shaft 21 by a wrench or other conventional tool. The other end of the shaft 21 has integrally formed therewith a number of fingers 22 designed to coact with slots 23 formed in the ring 17. With this arrangement when the shaft 21 is turned the fingers 22 will swing and since these fingers fit in and engage the walls of the slot 23 the swinging movement of the fingers is imparted to the ring or carrier 17 to shift the carrier circumferentially. When the shaft 21 is so turned as to shift the rim or carrier 17 in a counterclockwise direction as viewed in Figures 1, 4 and 5, the wedges 18 will be brought into engagement with the wedges 14 to properly position and support the demountable rim on the wheel. When the shaft 21 is so turned as to shift the carrier 17 in a clockwise direction as viewed in Figures 1, 4 and 5, the wedges 18 will be disengaged from the wedges 14.

Means is provided for releasably locking the carrier 17 in position to maintain the wedges 18 in engagement with the wedges 14. This means preferably comprises a ratchet 25 integrally formed with or suitably secured to the ring or carrier 17. The exposed side face of the ratchet is formed with a plurality of teeth having straight or vertical faces and inclined faces. A plurality of pawls 26 are provided and are superposed one on the other. All of the pawls 26 are mounted by means of a common pivot 27 on a bracket 28. In this manner the pawls 26 are so mounted as to be swung into engagement with the ratchet 25 or to be swung out of engagement therewith. The pawls 26 are loosely mounted on the pivot 27 and are independently swingable with respect to each other. The free end of each pawl 26 is formed with a plurality of teeth 28 designed to mesh with the teeth of the ratchet 25. The teeth 28 of the several pawls are staggered with respect to each other so that the teeth of the ratchet 25 will always be engaged by the teeth 28 of one of the pawls 26. However only one pawl 26 is cooperable with the ratchet teeth of the ratchet 25 in any one adjustment of the ring carrier 17. This arrangement is had with a view of insuring locking of the ring carrier 17 in any adjustment. Spring means is provided for urging the pawl 26 into engagement with the ratchet 25, and this means includes a flat blade spring 29 having its outer end split to provide a spring finger for each pawl 26. The tendency of the spring fingers is to swing the pawls 26 into engagement with the ratchet 25 and of course one such spring finger engages each pawl 26. In order to provide for the simultaneous release of all of the pawls 26 a common operating pin 30 is provided. The operating pin 30 is secured to the lowermost pawl 26 and extends through slightly elongated slots 31 provided in each of the other pawls 26. The pin 30 also operates in an elongated slot 32 provided in the base of the channel making up the fixed rim 11. With this arrangement the pin 30 may be moved to release all of the pawls 26 and yet when the rim is to be locked on the wheel, the pawls 26 are independently movable with respect to each other so that one of the pawls will engage the ratchet 25 and lock the carrier 17 in position.

A protective plate 35 may be provided for the operating member 20.

With this arrangement the demountable rim may be placed upon the wheel or taken therefrom with a minimum expenditure of time and labor. In fact it is only necessary to release the pin 30 and turn the shaft 21 through a partial rotation to remove the demountable rim, for when this has been done the demountable rim may be pulled from the wheel since the wedges 18 have been disengaged from the wedges 14. To replace the rim on the wheel it is only necessary to put the same in position with the wedges 14 in the notches 16 and to rotate the shaft 21 through a fraction of a revolution. Moreover when the rim is in position on the wheel it is rigidly and positively supported so as to preserve the alinement of the rim on the wheel and prevent distortion of the parts.

We claim:

1. In combination, a wheel having a fixed rim, a demountable rim adapted to be mounted on the fixed rim, wedges on said demountable rim, a carrier mounted on the fixed rim and comprising a ring shiftable circumferentially with respect to the fixed rim, wedges on said carrier, means for shifting the carrier to bring the wedges thereof into engagement with the wedges of the demountable rim or to move said wedges out of engagement with each other, and releasable locking means for holding the carrier in position to maintain the wedges engaged, said releasable locking means including a ratchet carried by said ring and a plurality of independently swingable pawls carried by the fixed rim and cooperable with the ratchet, the teeth of the pawl being staggered.

2. In combination, a wheel having a fixed rim, a demountable rim adapted to be mounted on the fixed rim, wedges on said demountable rim having slots provided with converging side faces and inclined bottom faces, a shiftable carrier mounted on the fixed rim, and wedges on said shiftable carrier of corresponding formation with respect to the wedges of the demountable rim and designed to cooperate therewith.

FRANK WILLIAM SCHROEDER.
JOHN WESLEY WILCOX.